US012162524B2

(12) United States Patent
Cross et al.

(10) Patent No.: US 12,162,524 B2
(45) **Date of Patent: *Dec. 10, 2024**

(54) MASS TRANSIT SAFETY NOTIFICATION SYSTEM AND DEVICE

(71) Applicant: STC, Inc., McLeansboro, IL (US)

(72) Inventors: Brad Cross, McLeansboro, IL (US); Destry Diefenbach, Benton, IL (US); Yogesh Barve, McLeansboro, IL (US); Pete Ksycki, McLeansboro, IL (US); Scott Kolts, Dahlgren, IL (US); Steve McDonald, Carterville, IL (US)

(73) Assignee: STC, Inc., McLeansboro, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/520,480

(22) Filed: Nov. 27, 2023

(65) Prior Publication Data

US 2024/0101173 A1 Mar. 28, 2024

Related U.S. Application Data

(63) Continuation of application No. 16/027,700, filed on Jul. 5, 2018, now Pat. No. 11,827,257, which is a (Continued)

(51) Int. Cl.
*B61L 23/06* (2006.01)
*B61L 15/00* (2006.01)
(Continued)

(52) U.S. Cl.
CPC ........... *B61L 23/06* (2013.01); *B61L 15/0027* (2013.01); *B61L 23/34* (2013.01); *B61L 25/021* (2013.01);
(Continued)

(58) Field of Classification Search
CPC ...... B61L 23/06; B61L 15/0027; B61L 23/34; B61L 25/021; B61L 25/025; B61L 2205/04; G08G 9/00
See application file for complete search history.

(56) References Cited

U.S. PATENT DOCUMENTS 5,539,398 A 7/1996 Hall et al.
5,661,474 A 8/1997 Douglas
(Continued)

FOREIGN PATENT DOCUMENTS

CN 109254298 A 1/2019
JP 2006224737 A 8/2006
(Continued)

OTHER PUBLICATIONS

Final Office Action in related U.S. Appl. No. 17/077,879, dated Jan. 9, 2024, 10 pages.
(Continued)

*Primary Examiner* — James J Yang
*Assistant Examiner* — Anthony D Afrifa-Kyei
(74) *Attorney, Agent, or Firm* — Lewis Rice LLC

(57) ABSTRACT

A system and device that will notify roadway maintenance workers of an approaching mass transit vehicle and, conversely, will notify the operators and administrators of mass transit vehicles of roadway maintenance workers within the vicinity of an approaching section of track.

7 Claims, 4 Drawing Sheets

Related U.S. Application Data continuation of application No. 15/370,655, filed on Dec. 6, 2016, now Pat. No. 10,029,716, which is a continuation of application No. 13/652,217, filed on Oct. 15, 2012, now Pat. No. 9,542,852.

(60) Provisional application No. 61/547,387, filed on Oct. 14, 2011.

(51) Int. Cl.
*B61L 23/34* (2006.01)
*B61L 25/02* (2006.01)
*G08G 9/00* (2006.01)

(52) U.S. Cl.
CPC .............. *B61L 25/025* (2013.01); *G08G 9/00* (2013.01); *B61L 2205/04* (2013.01)

(56) References Cited

U.S. PATENT DOCUMENTS

| | | | |
|---|---|---|---|
| 5,727,758 A | 3/1998 | Penza et al. | |
| 5,924,651 A | 7/1999 | Penza et al. | |
| 6,064,319 A | 5/2000 | Matta | |
| 7,624,952 B1 | 12/2009 | Bartek | |
| 8,232,888 B2 | 7/2012 | Frederick et al. | |
| 8,477,021 B2 | 7/2013 | Slack | |
| 9,542,852 B2 * | 1/2017 | Cross | B61L 23/06 |
| 10,029,716 B2 * | 7/2018 | Cross | B61L 25/021 |
| 11,465,660 B2 | 10/2022 | Green et al. | |
| 11,827,257 B2 * | 11/2023 | Cross | B61L 15/0027 |
| 2002/0186135 A1 | 12/2002 | Wagner | |
| 2003/0169181 A1 | 9/2003 | Taylor | |
| 2004/0075562 A1 | 4/2004 | Land | |
| 2005/0068169 A1 | 3/2005 | Copley et al. | |
| 2005/0134450 A1 | 6/2005 | Kovach | |
| 2005/0275513 A1 | 12/2005 | Grisham et al. | |
| 2010/0271214 A1 | 10/2010 | Frederick | |
| 2011/0006912 A1 | 1/2011 | Sheardown et al. | |
| 2011/0278401 A1 | 11/2011 | Sheardown et al. | |
| 2012/0025964 A1 | 2/2012 | Beggs et al. | |
| 2013/0143586 A1 | 6/2013 | Williams et al. | |
| 2015/0060608 A1 | 3/2015 | Carlson et al. | |
| 2019/0039627 A1 | 2/2019 | Yamamoto | |
| 2021/0026881 A1 | 1/2021 | Nakabayashi et al. | |

FOREIGN PATENT DOCUMENTS

| | | |
|---|---|---|
| JP | 2008017660 A | 1/2008 |
| JP | 2008176600 A | 7/2008 |
| KR | 200326769 Y1 | 9/2003 |
| KR | 20040060261 A | 7/2004 |
| KR | 20110032276 A | 3/2011 |
| WO | 2018158711 A1 | 9/2018 |

OTHER PUBLICATIONS

Final Office Action from related U.S. Appl. No. 17/077,879, dated Dec. 7, 2023, 9 pages.

Federal Transit Administration, "Technology Presentations," Transit Advisory Committee for Safety (TRACS), Feb. 25, 2020, U.S. Department of Transporation, 126 pages.

International Search Report and Search Report in PCT/US2012/060279, mailed Mar. 29, 2013, 11 pages.

Non-Final Office Action in U.S. Appl. No. 17/077,899, mailed May 4, 2023, 8 pages.

Non-Final Office Action in U.S. Appl. No. 17/077,899, mailed May 9, 2024, 10 pages.

* cited by examiner

MASS TRANSIT SAFETY NOTIFICATION SYSTEM AND DEVICE

CROSS REFERENCE TO RELATED APPLICATION(S)

This Application is a Continuation of U.S. patent application Ser. No. 16/027,700 filed Jul. 5, 2018, which is a Continuation of U.S. patent application Ser. No. 15/370,655, filed Dec. 6, 2016 which is a Continuation of U.S. Utility patent application Ser. No. 13/652,217, filed Oct. 15, 2012 and now U.S. Pat. No. 9,542,832, which, in turn, claims the benefit of U.S. Provisional Patent Application Ser. No. 61/547,387, filed Oct. 14, 2011. The entire disclosure of all the above documents is herein incorporated by reference.

BACKGROUND

1. Field of the Invention

This disclosure is related to the field of safety devices for mass transit and roadway maintenance workers and mass transit vehicles. Specifically, this disclosure is related to systems and devices that will notify roadway maintenance workers of an approaching mass transit vehicle and, conversely, will notify the operators and administrators of mass transit vehicles of roadway maintenance workers within the vicinity of an approaching section of track.

2. Description of Related Art

As the number of mass transit routes and light rail lines throughout metropolitan areas increases, so does the potential for transit, worker, and pedestrian accidents. Despite improvements in track signals, train controls, and railroad communication technology, the incidence of fatal train collisions has dramatically increased in recent years. In fact, train injuries and fatalities in the United States have increased about 15% since 1998, a period in which commuter and mass transit lines and number of runs per line has increased dramatically in many major metropolitan areas.

Generally, rail, road, and mass transit maintenance workers are often the most vulnerable for pedestrian accidents on rail lines. These individuals are often working on or in close proximity to rail lines and roads. Thus, their location alone puts them at a higher risk margin for mass transit and vehicular accidents. In addition, much of the work that rail, mass transit, and road maintenance workers are engaged in is noisy, high decibel work involving heavy machinery; e.g., jack hammers, sledge hammers, nail guns, blow torches, etc. The noise associated with this work can make it difficult if not impossible for individuals working on a track, route or road to hear a train, light rail or other vehicle coming their way before it is too late. Further, many modern trains and mass transit vehicles, such as electric trains, are designed to run quietly. While the operators of the trains, rails, vehicles, and mass transit routes are often aware of construction zones on the tracks, routes, and roads, workers, in the normal course of their work, can often stray from these zones to other areas-areas where operators are not prepared to encounter workers. Further, while workers are often made aware of the train and mass transit schedule and, by extension, when to expect mass transit vehicles in areas of construction, mass transit vehicles can often be ahead or behind schedule, thus confounding this safety variable. In addition, many workers just simply lose track of time while they are on the job.

Accordingly, there is a need in the art for a safety system and device that can be utilized by mass transit, train, and road maintenance workers and other individuals working in close proximity to mass transit routes, rails, and roads which has the ability to alert them to the presence of oncoming vehicles (specifically equipped vehicles) and also has the ability to alert mass transit operators to the presence of individuals on the mass transit routes, trains, or roads prior to the time period in which they enter the operator's line of sight.

SUMMARY

Because of these and other problems in the art, described herein, among other things, is a safety notification system and device that: 1) alerts mass transit, train, and road maintenance workers of an approaching mass transit vehicle; 2) alerts train and mass transit vehicle operators when they are approaching an area where workers are located; and 3) informs administrators of the location of vehicles and workers within a traffic grid in real-time, among other safety functions. Thus, this safety notification system and device has the capability to, among other things, act as a warning system for workers, a worker warning system for trains and a worker monitoring system for administrators.

Thus, described herein is a safety notification system for a mass transit grid, the system comprising: a mass transit grid; one or more vehicles in the mass transit grid equipped with vehicle equipment units; one or more individuals in the mass transit grid equipped with personal notification units; one or more warning zones in the mass transit grid; and a network which communicatively connects the vehicle equipment units to the personal notification units; wherein the personal notification units transmit location-based information of the individuals equipped with the personal notification units to the vehicle equipment units; wherein the vehicle equipment units receive the information transmitted from the personal notification units; wherein the vehicle equipment units transmit automatic vehicle location information of the vehicles equipped with the vehicle equipment units to the personal notification units; wherein the personal notification units receive the information transmitted from the vehicle equipment units; wherein, based upon the information received from the vehicle equipment units and the position of the one or more of warning zones, the personal notification units determine whether to enter an alert mode; and wherein the personal notification units transmit warnings to individuals based upon the alert mode.

In one embodiment of the safety notification system for a mass transit grid, the personal notification unit is a handheld hardware device. In another embodiment, the personal notification unit is integrated into the one or more individual's safety equipment.

In yet another embodiment of the safety notification system for a mass transit grid, the system further comprises: one or more defined routes; wherein, based upon the information received from the vehicle equipment units, the position of the one or more warning zones, and the position of the one or more defined routes, the personal notification units determine whether to enter an alert mode.

In one embodiment of the safety notification system for a mass transit grid, the one or more of the one or more of the warning areas is fixed by geographic coordinates. In another embodiment, the one or more of the one or more warning areas is modified according to the associated vehicle's speed.

In still another embodiment of the safety notification system for a mass transit unit, the personal notification unit transmits the alert mode to the one or more vehicles in the mass transit grid equipped with a vehicle equipment unit; and based on the alert mode, the one or more vehicle equipment units modify the speed of the associated vehicles.

In another embodiment of the safety notification system for a mass transit unit, one of the one or more warning areas is a silent area; wherein the personal notification units in the silent area are preventing from triggering alert modes.

Further, in another embodiment of the safety notification system for a mass transit unit, one of the one or more warning areas is a geoguard area and the personal notification units in the geoguard area enter an alert mode when the individual equipped with the personal notification unit leaves the geoguard area.

In still another embodiment of the safety notification system for a mass transit unit, one of the one or more warning areas is a restricted area; and the personal notification units trigger the alert mode when they enter the restricted area.

Further, in another embodiment of the safety notification system for a mass transit unit, the personal notification units will enter a fail-safe alert mode when the personal notification unit losses its ability to determine its location.

In still another embodiment of the safety notification system for a mass transit vehicle, the personal notification units are further comprised of a panic button; and the panic button will send an alert signal to other personal notification units within a defined area when activated.

In another embodiment of the safety notification system for a mass transit vehicle, the vehicle equipment units are further comprised of a user interface; and the user interface displays the location of the one or more vehicles in the mass transit grid equipped with vehicle equipment units and the one or more individuals in the mass transit grid equipped with personal notification units in real time.

Further, in another embodiment of the safety notification system for a mass transit vehicle, the personal notification units store information on personal notification unit activity and alert logs.

Further, in another embodiment of the safety notification system for a mass transit vehicle, the system is further comprised of a personal notification unit interrogator; and the personal notification unit interrogator downloads the information on personal activity and alert logs stored on the personal notification units.

In another embodiment, the safety notification system for a mass transit vehicle further comprises a central control server communicatively attached to the network.

In still another embodiment of the safety notification system for a mass transit vehicle, the system further comprises a plurality of priority detectors communicatively attached to the network.

In one of the embodiments of the safety notification system for a mass transit vehicle, the intensity of the warnings corresponds to an identified safety risk.

Also disclosed herein is a safety notification system for a mass transit grid, the system comprising: a mass transit grid; one or more vehicles in the mass transit grid equipped with vehicle equipment units; one or more individuals in the mass transit grid equipped with personal notification units; and a network which communicatively connects the vehicle equipment units to the personal notification units; wherein the personal notification units transmit location-based information of the individuals equipped with the personal notification units to the vehicle equipment units; wherein the vehicle equipment units receive the information transmitted from the personal notification units; wherein the vehicle equipment units transmit automatic vehicle location information of the vehicles equipped with the vehicle equipment units to the personal notification units; wherein the personal notification units receive the information transmitted from the vehicle equipment units; wherein, based upon the information received from the vehicle equipment units, the location of the personal notification units, certain defined variables, and the position of a plurality of defined routes, the personal notification units determine whether to enter an alert mode; and wherein the personal notification units transmit warnings to individuals based upon the alert mode.

Finally disclosed herein is a method for safety notification in a mass transit grid, the method comprising: equipping an individual in a mass transit grid with a personal notification device; having the personal notification device determine location-based coordinates of the equipped individual; transmitting the location-based coordinates from the personal notification device to a vehicle equipment unit located in a vehicle in the mass transit grid; having the vehicle equipment unit receive the location-based coordinates; having the vehicle equipment unit transmit automatic vehicle location information to a personal notification unit located in the mass transit grid; having the personal notification unit receive the automatic vehicle location information; having the personal notification unit determine whether a warning signal needs to be transmitted to the individual based upon the location-based coordinates, the automatic vehicle location information and a variety of inputs; and having the personal notification unit emit a warning sound upon receiving the warning signal.

DESCRIPTION OF THE PREFERRED EMBODIMENT(S)

Figure 1:
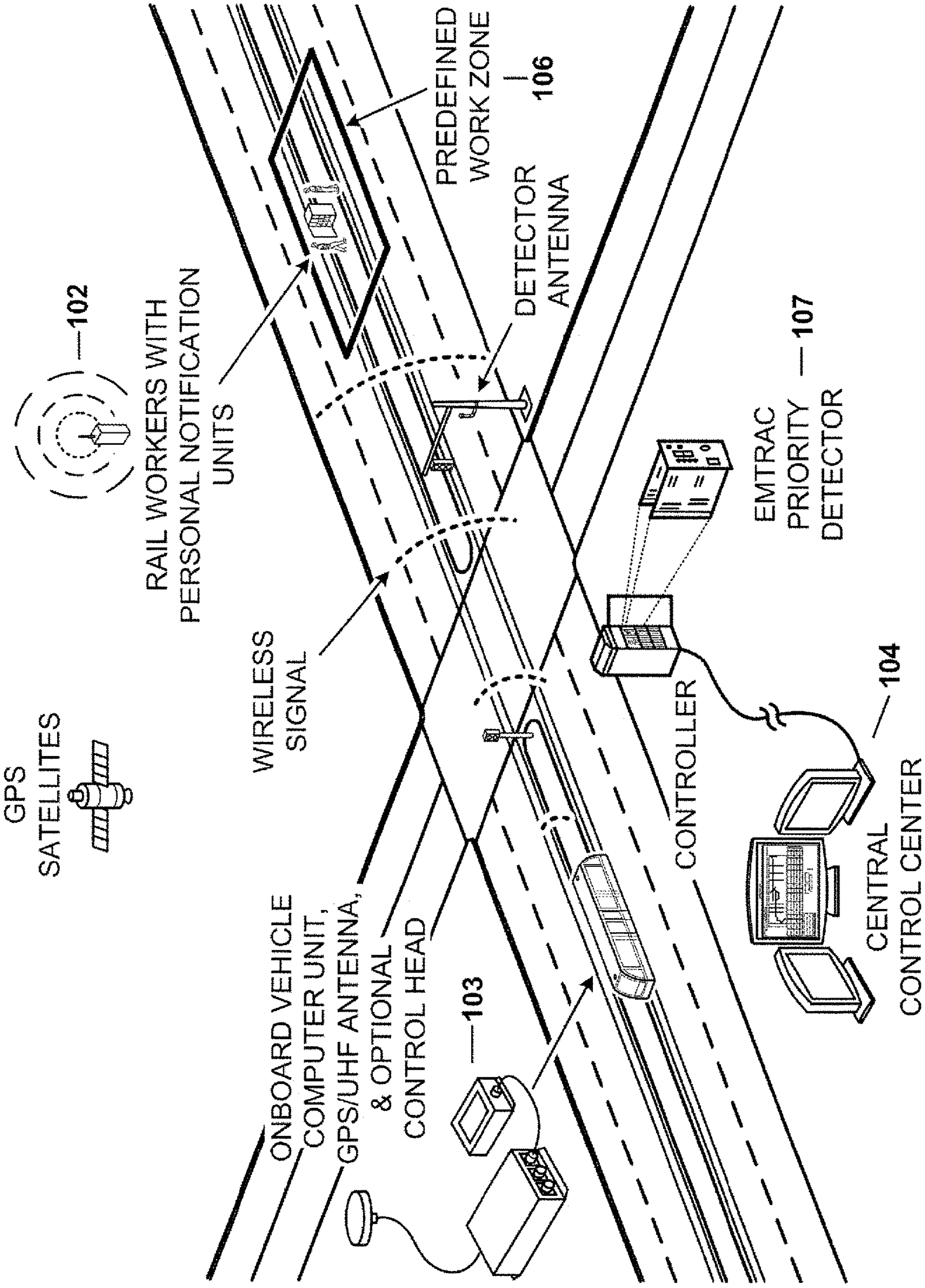
FIG. 1 provides a perspective view of a diagram of the rail-maintenance safety notification system and device (101) in use with warning zones.

This disclosure is intended to teach by way of example and not by way of limitation.

Generally, the safety notification system and device (101) described herein is contemplated for use in an applicable mass transit system known to those of ordinary skill in the art and, in certain embodiments, is integrated into existing systems known to those of ordinary skill in the art which monitor and control the operation of the mass transit systems. Contemplated applicable mass transit systems include, but are not limited to, rapid transit, underground, subway, elevated railway, metro, metropolitan railway, light rail, premetro, street cars, trams, interurbans, dedicated bus and trains. For the purpose of simplicity, the term "train" will be utilized in this application to represent each of these possible mass transit systems. Further, while the safety notification system of this application will be described in conjunction with mass transit systems, it should be understood that the device and systems described herein may be utilized in any setting in which personal notification of an approaching vehicle or unit would be prudent and/or necessary as a safety measure such as, but not limited to, working in conjunction with freight rail tracks.

As a preliminary matter, it is noted that, in a preferred embodiment, the safety device and system (101) disclosed herein is integrated into an existing mass transit monitoring/control system known to those of skill in the art, such as a positive train control system (PTC). As used in this application, a PTC is any system known to those of ordinary skill in the art for the monitoring and controlling of the movements of mass transit vehicles. Stated differently, any system known to those of ordinary skill in the art through which a mass transit vehicle receives and transmits information about its location and which encompasses on-board equipment which enforces this, detecting unsafe or unexpected movement, is contemplated as operating with the systems described in this application. Generally the PTC systems contemplated in this application will involve the additional following basic components to implement under safety systems: 1) a speed display and control unit in the mass transit vehicle; 2) a method to dynamically inform the speed control unit of the changing track and signal conditions and, in some scenarios, alter the speed based upon changing conditions; 3) a system to actively monitor the speed and location of a mass transit vehicle on a particular route; 4) a system to determine a mass transit vehicle's estimated time of arrival at a given point on a route; and 5) a system to monitor the position and progress of mass transit vehicles, along with other variables, in a mass transit grid. Other possible components in the utilized PTC systems include, but are not limited to: an on-board navigation system and track profile database to enforce speed limits; a bi-directional data link to inform signaling equipment of the train's presence; and centralized systems to directly issue movement authorities to mass transit vehicles.

Generally PTC systems implemented through fixed signaling infrastructures (such as coded track circuits and wireless transponders to communicate with the on-board speed control unit) and wireless signaling infrastructures (which utilize wireless data radios spread out along a line to transmit dynamic information), among other PTC systems known to those of ordinary skill in the art are contemplated in this application.

In one embodiment, the mass transit safety notification system and devices (101) disclosed herein are generally comprised of at least one worker equipment unit, also known as the personal notification unit (PNU) (102), and at least one mass transit equipment unit, also known as the vehicle computer unit (VCU) (103), communicatively attached to each other over a network.

In general, as will be described further herein, the one or more PNUs (102) in the system and the one or more VCUs (103) in the system are consistently sending and receiving location-based packaged data over the network. Based upon this exchanged location-based data, the route and bearing of one or more vehicles in the grid, and/or the location of the one or more vehicles or the one or more PNUs (102) relative to a designated warning area or route, an alert mode is triggered by the one or more PNUs (102), the one or more VCUs (103), or central control server (104). Among other things, when an alert mode is activated in the system (101) certain alert signals will be set off. It is contemplated that the alert signals can take on varying levels of intensity (e.g., a low level signal for a low risk situation, a high level signal for a high risk situation). These alert signals notify a worker equipped with a PNU (102), a vehicle operator, or an administrator of a potentially dangerous interaction between an equipped worker and a vehicle within the grid.

As a preliminary matter, prior to an explanation of the methodology of the overall system, the contemplated components of the system will be discussed. Each of both the PNU (102) and the VCU (103) are comprised of at least a receiver, a transmitter, a computer and a navigation system. As used herein, the term "transmitter" shall be understood to encompass any electronics device which produces radio waves, or other known communication modalities, for the communication of information over a distance known to those of skill in the art. Further, as used herein, the term "receiver" shall be understood to encompass an electronic circuit known to those of skill in the art that is capable of receiving radio signal inputs, separating the wanted radio signal from all other picked-up radio signals, amplifying the signal to a level suitable for further processing and converting the signal through demodulation and decoding into usable form. It should also be understood that transmitter and receiver combination "transceivers" are also contemplated for the transmitter/receivers of this application.

It is also notable that, throughout this disclosure, the term "computer" will be used to describe hardware which implements functionality of various systems. The term "computer" is not intended to be limited to any type of computing device but is intended to be inclusive of all computational devices including, but not limited to, processing devices or processors, personal computers, work stations, servers, clients, portable computers, and hand held computers. Further, each computer discussed herein is necessarily an abstraction of a single machine. It is known to those of ordinary skill in the art that the functionality of any single computer may be spread across a number of individual machines. Therefore, a computer, as used herein, can refer both to a single standalone machine, or to a number of integrated (e.g., networked) machines which work together to perform the actions. In this way the functionality of the vehicle computer or the PNU computer may be at a single computer, or may be a network whereby the functions are distributed.

In a preferred embodiment, it is contemplated that the receivers and transmitters of the system disclosed in this application will operate on a secure ultra-high frequency (UHF) hopping spread spectrum. However, it should be recognized that operation on this frequency is not determinative as it is contemplated that the disclosed system (101) could also operate on a fixed-frequency transmission range or any other transmission range or spectrum as well as any communication protocol known to those of skill in the art.

The VCU (103) of the disclosed safety system (101) is generally capable of sending communications to and receiving communications from a plurality of PNUs (102), a plurality of signal light controllers, a central control server (104), and a plurality of priority detectors (107), amongst other components in the networked traffic grid system. The VCU (103) is generally an onboard unit, in certain embodiments integrated with a PTC system, that tracks real-time vehicle location, transmits approaching-vehicle alerts, receives signals from other components in the system (such as alert signals from PNUs), controls or has the ability to alter vehicle function, and stores activity logs. In other embodiments, the VCU (103) may also transmit signal priority requests, in addition to other functions. In addition, the VCU (103) is generally capable of functioning as a receiver for a satellite positioning system. Generally, any satellite positioning system known to one of ordinary skill in the art is contemplated including, but not limited to, the Global Positioning System (GPS), the Russian Global Navigation Satellite System (GLONASS), the Chinese Compass navigation system and the European Union's Galileo positioning system. Again, any receiver technology known to those of skill in the art that is able to calculate its position by precisely timing the signals sent by satellites is a contemplated receiver in the disclosed system (101). Notably, in other embodiments it is also contemplated that navigation and positioning will be determined by dead reckoning, triangulation of cell phone signals, inertial guidance mechanisms, or other positioning technologies in place of or in addition to GPS systems.

Installation of the VCU (103) of the safety system (101) into a mass transit vehicle can be either permanent, by direct integration into the mass transit vehicle—particularly into the PTC (102) of the particular mass transit unit and the overall grid—or temporary, through a mobile receiver that can be taken into and removed from the vehicle. Generally, a GPS receiver (or other contemplated positioning system) of the VCU (103) will function to determine the mass transit vehicle's position, direction, velocity and bearing relative to the vehicle's route and defined warning zones (106) on the route in real time at any given point during its travels. A second radio receiver will function to receive the information and radio signals transmitted by a plurality of PNUs (102), the central control server (104), and plurality of priority detectors (105), amongst other components in the network, while the transmitter functions to transmit information and radio signals to a plurality of PNUs (102), the central control server (104) and plurality of priority detectors (105), amongst other components in the network.

The computer of the VCU (103) (and, in some embodiments, the central control server (104)), through the inputs received, in part, from one or more PNUs (102) in the system (101), knowledge of the route, established warning areas (106), established routes (108), the current velocity of the vehicle, the vehicle's heading, the vehicle's bearing, the presence of PNU alert signals in the network, and the vehicle's position, among other inputs, in certain embodiments, functions to send safety signals to and receive safety signals from PNUs in the network, the vehicle operator, and operators at the central control server (106) monitoring the overall grid. For example, in one operation an alert signal will be sent to an approaching vehicle when one or more workers equipped with a PNU (102) are in an established warning area (106) in the route. In another operation, an alert signal will be sent to an approaching vehicle when one or more workers equipped with a PNU (102) are within a certain location, time, bearing, distance or velocity of a vehicle within the grid. The contemplated warning areas (106) and directed routes (108) of this system will be described in more detail later in this application. In general, the warning areas (106) are either fixed or moving areas in the grid that define a specific safety and notification distance between a given worker and a vehicle in the mass transit grid.

In one embodiment, if it is determined that a worker is on or near a warning area (106) or within a particular bearing from a vehicle's route, generally the VCU (103) computer (in one embodiment through the PTC) will instruct the train to gradually slow down to a speed that will allow it to stop, if needed, before encountering the worker on the tracks. If, later, the VCU (103) receives inputs that the worker has left the warning area (106) or the particular high risk bearing from the vehicle's route, the train will be instructed to resume its normal cruising speed.

Further, in certain embodiments, the VCU (103) will also send automatic vehicle location (AVL) packets to the other components of the network, in particular to the plurality of PNUs (102) in the network. In other embodiments, it is also contemplated that the AVL signal can be picked up by a plurality of priority detectors (107) in the system and relayed to the central control server (104). The AVL signal includes, but is not limited to, location-based information about the vehicle (e.g., its velocity, acceleration, direction, route, bearing, etc.). In a preferred embodiment, it is contemplated that these AVL signals will be sent at automatically defined intervals (e.g., every 30 seconds). In other embodiments, the AVL signals can be sent conditionally in response to an event (such as the VCU receiving a signal from a PNU in the system), manually by an operator, or in a combination of automatic, manual and conditioned transmissions. In certain embodiments, these AVL signals are transmitted through the network to the plurality of PNUs (102).

In one embodiment of the computer of the VCU (103), the computer will be equipped with monitor software which allows for the real-time monitoring and display of worker activity and locations on a user interface. It is contemplated that this user interface can be located in the vehicle, at a central or regional monitor, or via a mobile interface known to those of ordinary skill in the art, such as a tablet computer or smart phone. Further, it is contemplated that the interface will display worker locations on or near the rail line or route on geographic maps. The interface may also show the real-time location of the one or more PNUs in the grid. Further, in another embodiment, it is contemplated that the computer of the VCU (103) will have the capability to create detailed logs and reports which show worker location and alert histories along the route. These logs and reports may be generated and automatically e-mailed to administrators or other interested individuals.

In another embodiment, it is contemplated that the computer of the VCU (103) will have multiple communication functions including, but not limited to, PNU warning (the communication in which a signal is sent to a given PNU (102), warning of an impending mass transit vehicle), signal priority requests, and Positive Train Control (controlling the velocity and direction of a mass transit unit while on route).

The PNU (102) is generally a small, portable device capable of receiving GPS and transmitting its location data and storing detailed activity and alert logs, among other functions. Similar to the transceiver in the VCU (103), the worker transceiver of the PNU (102) is generally capable of sending communications to the VCU (103), the central control server (104), a plurality of priority control units (107), a plurality of signal light controllers, other PNUs (102), and other components of the system. Further, similar to the receiver in the VCU (103), the receiver of the PNU (102) is generally capable of receiving communications from the VCU (102), the central control server (104), a plurality of priority control units (107), a plurality of signal light controllers, other PNUs (102), and other components of the system. Also, like the VCU (103), the PNU (102) is capable of functioning as a receiver for a satellite positioning system (or other known navigation and positioning system), thereby determining the worker's position, direction and velocity in real time at any given point.

In one embodiment, it is also contemplated that the PNU (102) contains a power source. Contemplated sources include, but are not limited to, lithium ion batteries, potassium-ion batteries, nanowire batteries and self-contained power sources such as solar power, movement-based power generation, and energy harvesting.

The computer of the PNU (102) generally serves four main functions. First, the computer of the PNU (102) transmits, either constantly or at pre-timed intervals, the location data of the worker equipped with the PNU (102) to the VCU (103), central control server (104), other PNUs (102), a plurality of signal controllers, a plurality of priority detectors (105), and/or other components of the network. Second, the computer of the PNU (102) receives communications and information from the VCU (103), central control server (104), other PNUs (102), a plurality of priority detectors (107), and/or other components of the network. Such information includes, but is not limited to, the AVL of vehicles in the grid, the bearings of approaching vehicles in the grid, and the location of warning areas or defined routes in the grid. As will be discussed in more detail later in this application, warning areas (106) can be configured by geographic coordinates or, in certain embodiments, by different estimated times of arrival (ETAs). Third, the computer of the PNU (102), based upon the location data received from the plurality of VCUs (103) in the system, the location of warning areas (106), the bearing of VCUs on pre-defined routes, and the location-data of the PNU (102), amongst other information transmitted over the system, can identify alert mode conditions. Fourth, the computer of the PNU (103) can transmit audible, movement or visual warnings to a worker when it determines an alert condition exists or when it receives an alert signal from a VCU (103), the central control server (104), a priority detector (105), other PNUs (102) or other component of the network. Contemplated audio, movement and visual alert signals include, but are not limited to, ultra bright LEDs, vibrations and high volume speakers. Notably, the strength of the alert signal can vary depending on the risk posed. For example, if a PNU (102) is merely in the vicinity of a vehicle but is not at risk of being hit by the vehicle, a low level warning (e.g., a light vibration or beep) will be emitted. Conversely, if a PNU (102) is in a potential collision zone, a high level warning (e.g., a stronger vibration or beep) will be emitted. These alert signals generally function to ensure that a worker is made aware of an oncoming vehicle and given notice to clear the area, even over the high noise level generally associated with construction sites. Thus, the worker is alerted that a vehicle is approaching and they need to clear the area and move a safe distance from the oncoming mass transit vehicle.

In certain embodiments, when a PNU (102) within the grid determines that an alert condition is present, the PNU (102) will go into alert mode. In alert mode, in certain embodiments, in addition to sending out an alert signal, the PNU will transmit a special high alert packet into the network and each of the components of the network to notify them of the alert situation. It is contemplated that the PNU (102) will cease to send out this packet when the situation giving rise to the alert signal is no longer present, e.g., the PNU leaves the warning zone or the train slows down.

Figure 2:
FIG. 2 provides a perspective view of an embodiment of a portable handheld PNU (102).

In one embodiment, the PNU (102) can be a simple hardware device that can be carried by or attached to an individual rail-maintenance worker by a method known to those of ordinary skill in the art. FIG. 2 provides a depiction of the embodiment of the PNU (102) in which the device is a simple handheld hardware device. In other embodiments, it is contemplated that the PNU (102) will be integrated into safety equipment worn by a rail maintenance worker including, but not limited to, helmets, belts and safety vests. In these integrated embodiments, the PNU (102) can be permanently attached to the piece of safety equipment or, in alternate embodiments, may simply be temporarily attached to the safety equipment by a pocket, clip or other applicable attachment modality known to those of ordinary skill in the art. In other embodiments, it is contemplated that the PNU will be integrated into a device commonly carried by the worker, such as a cell phone.

Taken together, the PNU (102) is a device which is communicably linked to the VCUs (103), other PNUs (102) and, in other embodiments, the central control server (104), the signal light controllers, and a plurality of priority detectors (107), and functions to identify potentially unsafe conditions and also alert maintenance, construction, and first-response personnel when potentially unsafe conditions exist. Further, in some embodiments, the functionality and signaling capability of the PNU (102) is integrated into a given mass transit systems monitoring and control system.

In another embodiment of the disclosed safety notification system and device (101), the system is further comprised of one or more PNU Interrogators (108). The PNU Interrogator (108) is a network-connected unit generally installed at PNU (102) charging stations. The PNU Interrogator (108) automatically downloads activity logs from the PNU (102) and uploads firmware or database updates. The PNU Interrogator (102) is generally located near the PNU charging station (i.e., the location at which the individual PNUs (102) are recharged), however, it should be noted that the PNU Interrogator (108) could be located anywhere in the system. The PNU Interrogator (108) functions as an intermediary in the overall system, downloading, sometimes automatically, the activity, alert logs and other data stored in each individual PNU (102) and uploading database and firmware updates from the central server (104) to each individual PNU (102), among other functions. The function can be performed wirelessly or by physically connecting a PNU (102) to a PNU Interrogator (108) in the network.

In another embodiment, the system (101) is further comprised of a centralized control server (104). The centralized control server (104) is generally a computer or series of computers that link other computers or electronic devices together. Generally, any known combination or orientation of server hardware and server operating systems known to those of ordinary skill in art is contemplated. As detailed more fully at other locations within this application, the centralized server (104) is communicably linked to the PNUs (102), VCUs (103), PNU Interrogators (108), and plurality of priority detectors (107) in the system by a wireless network or a combination of a wired and wireless network that allows for the free transmission of information and data, allowing centralized control of a number of signals. In one embodiment, the centralized control server (104) will have a plurality of central monitors upon which worker/PNU locations, activity from PNUs (102), activity from VCUs and vehicle location and speed can be depicted in real time. Further, in another embodiment, central monitor software will be installed on the central control server (104) which will provide for the display of real-time vehicle and worker locations, retrieval of activity logs, program updates and the configuration of system settings. Generally, any software application known to those of ordinary skill in the art which would provide transit operators and authorities the capability of monitoring VCU and PNU activity and location in the grin in real-time is contemplated in this application.

In another embodiment, the system will be further comprised of a plurality of priority detectors (107). The priority detectors (107), as that term is used herein, are wayside devices capable of receiving radio frequency (RF) signals and forwarding the received data through the network to a plurality of signal controllers, a plurality of VCUs, a plurality of PNUs, the centralized control server and other known and contemplated components of the network. These priority detectors (107) will generally be located at various locations along a particular vehicle's route. For example, one common location for priority detectors (107) will be at or in close proximity to intersections. Generally, these priority detectors function as intermediaries in the overall system (101), receiving signals from the central control server (104), VCUs (103) and PNUs (102) and forwarding the real-time vehicle and worker activity and alert notifications received in these signals to the central control server (104), VCUs (103), or PNUs (102).

Generally, the safety device and system (101) disclosed herein serves three main functions: 1) it acts as a warning system for workers equipped with PNUs (102); 2) it acts as a warning system for vehicles, notifying operators of the location of workers relative to the route and the location of the vehicle on the route; and 3) it acts as a worker monitoring system allowing for the monitoring of the location of vehicles and workers in the grid as a whole. In one embodiment, these functions are generally carried out through the creation of warning areas (106) in the grid and on a vehicle's route. In another embodiment, these functions are generally carried out by identifying alert situations based upon the distance, velocity, bearing and location-based information exchanged between the components of the system. It is contemplated that, in various embodiments, these modalities for identifying alert modes can both be utilized, or they can be utilized separately.

Notably, warning areas (106) in the disclosed system (101) can be fixed (e.g., by geographic coordinates) areas in the grid or moving (e.g., positioned in front of a train such that the position of the area changes and is modified with the velocity of the train). Generally, the warning areas (106) of the disclosed system (101), both fixed and mobile, are set up to designate rail lines, work areas or other areas where workers or other personnel may be located. These warning areas (106) are defined by their geographic coordinates, or their distance in relation to a component of the grid (e.g., a certain ETA in front of a train that corresponds to the amount of time the train would need to stop at its current velocity), and generally may take any shape (e.g., circular, polygonal, linear etc.). These areas (106) may be set up and configured to elicit different responses from the system (101). One warning area (106) is the silent area. In the silent area, PNUs (102) are prevented from triggering alert responses. PNUs (102) present within these areas will still receive signals from equipped vehicles, however they will remain silent and not issue alert signals within the area. These areas are useful to designate locations where personnel will be present but do not need to receive alerts because no safety issue is present.

Another warning area (106) is the track area. Generally, the track area will be set up along portions or the whole area of mass transit routes within the overall grid. The track zone serves the purpose of alerting personnel within the track area of approaching vehicles and notifying approaching vehicles of the presence of workers on or near the track. When a mass transit vehicle approaches this type of area, if a worker equipped with a PNU (102) is determined to be present within the track area, a PNU (102) and/or VCU (103) alert mode signal will be activated. These alerts include, but are not limited to: 1) alerts to the workers equipped with PNUs (102) within or at a location in close proximity to the track area, warning them of an approaching vehicle; 2) alerts to the operators of the vehicles in or approaching the track area notifying them of the presence or lack of presence of workers in the track area; 3) automatically altering the speed of the vehicles if necessary to ensure the safety of the workers in the area; and 4) alerts to the operators of the transit system as a whole at the central control server (104) to a possible safety situation.

Another type of warning area (106) is the geoguard area. This area activates an alert when a given PNU (102) leaves the defined area; i.e., a worker equipped with a PNU (102) leaves a defined geoguard work area. These areas are useful for maintaining security in a given location; e.g., these areas function to notify a worker equipped with a PNU (102) that they are in the wrong location or if the worker equipped with a PNU is outside a defined warning area (106).

Yet another contemplated warning area (106) is the restricted area. Generally, the restricted area functions to activate an alert when one or more PNUs (102) enter the restricted area. The alert may be sent to the PNUs (102) within the area to notify the personnel that they have entered unauthorized locations. An alert signal may also be sent to the central control server (104) to notify operators that one or more PNUs (102) are located off the grid in a sensitive area.

Through the use of these different warning areas (106), the system (101) has the ability to act as a train warning system for workers, a worker warning system for trains, and a worker and train monitoring system for the overall grid. Generally, the areas (106) may be created, modified, deleted or otherwise controlled either at the VCUs (103), the central control server (104), the PNUs (102), or at a system manager computer which may interface with the VCUs or PNUs. In addition, each individual PNU (102) may be set up at the VCU (103) or central control server (104) to respond to zones and the alert signals it receives differently. For example, individual PNUs (102) can be set up and adjusted to alert at a certain ETA (e.g., 20 seconds prior to arrival); a given distance away (e.g., 2 miles away regardless of direction of travel); if an oncoming mass transit vehicle exceeds a defined velocity (e.g., greater than 20 mph); and if an oncoming vehicle is approaching the current location of a PNU (102) with a certain defined bearing range (e.g., +1-50 degrees). The settings for PNUs (102) can be changed either by group or on an individual basis. In addition to settings, different alert modes for PNUs (102) may be utilized. Different levels of alert (e.g., low alert to high alert levels) and different alarms (e.g., LED alarm, vibration alarm and beeper alarm) may be utilized. In one embodiment with 3 levels of alert, level 1 is a low-level "caution" alert; level 2 is a medium alert, and level 3 is an intense possible direct confrontation alert.

FIG. 1 depicts the manner in which a PNU (102) determines whether to enter an alert mode in a warning area (106) embodiment. In this embodiment, a worker equipped with a PNU (102) is located within a warning area (106). Upon receiving an automatic vehicle location packet (AVL) from an approaching vehicle, the PNU (102) within the warning area will enter alert mode when the vehicle reaches a certain predefined ETA or distance from the warning area (106). In the alert mode, among other things, the alerted PNU (102) will trigger a warning call, as discussed previously, to notify the equipped worker of the high risk event. In addition, in the alert mode, among other things, the PNU (102) will begin to consistently send a special alert mode location-based packet over the network. This special alert mode packet notifies the other components of the system (101) of the high risk event. For example, in one embodiment the central control server (105) will display information regarding the high risk event (e.g., the location of the worker, the location of the vehicle and the response of both the vehicle and the worker to the alert) on the user interface, informing and allowing traffic grid administrators to monitor and modify the event.

Figure 3:
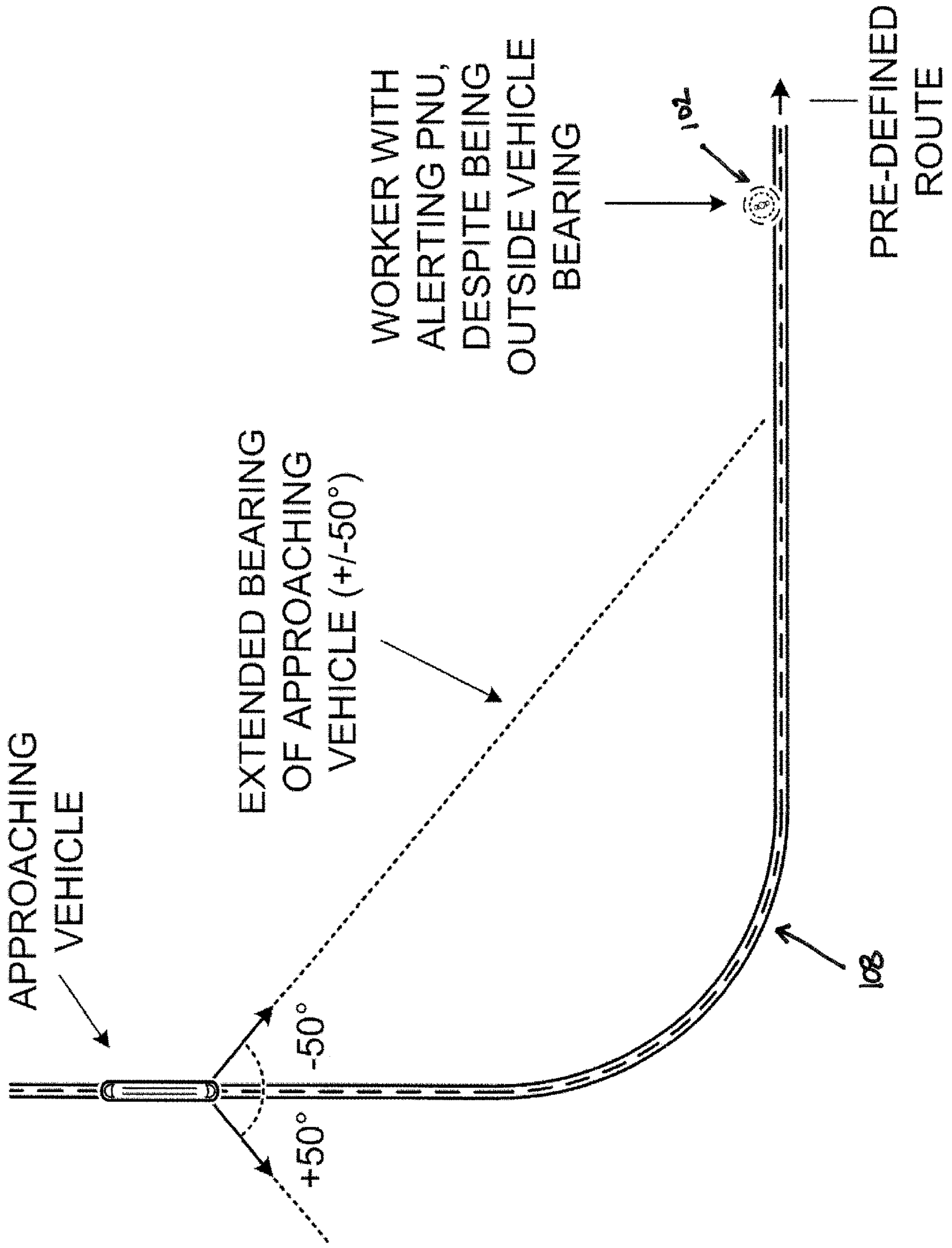
FIG. 3 provides a perspective view of a diagram of the rail-maintenance safety notification system and device (101) in use with a defined bearing or estimated time of arrival of an approaching vehicle.

FIG. 3 depicts one of the manners in which a PNU (102) enters an alert mode without use of a warning zone (106), in particular, how an alert mode is triggered by a PNU (102) within a defined bearing or ETA of an approaching vehicle. As depicted in FIG. 3, an alert mode is triggered by the PNU (102) when, based on the AVL packet received by the approaching vehicle, it is determined that the PNU (102) is within a defined bearing (e.g., 50 degrees off the median line of the approaching vehicle in both directions) or defined estimated time of arrival of the approaching vehicle. Notably, it should be understood that the defined bearing and estimated time of arrival that trigger this location-based alert mode by the PNU (102) can be modified and changed at the level of the PNU (102), the VCU (103) or the central control server (104). Further, as depicted in FIG. 2, it is contemplated that the system can also be configured to trigger a low level alert mode for PNUs (102) located outside of the defined bearing or estimated time of arrival which are still within a certain distance of the vehicle. This low level alert simply serves as a warning to the individual equipped with the PNU (102) that a vehicle is located in the vicinity.

Figure 4:
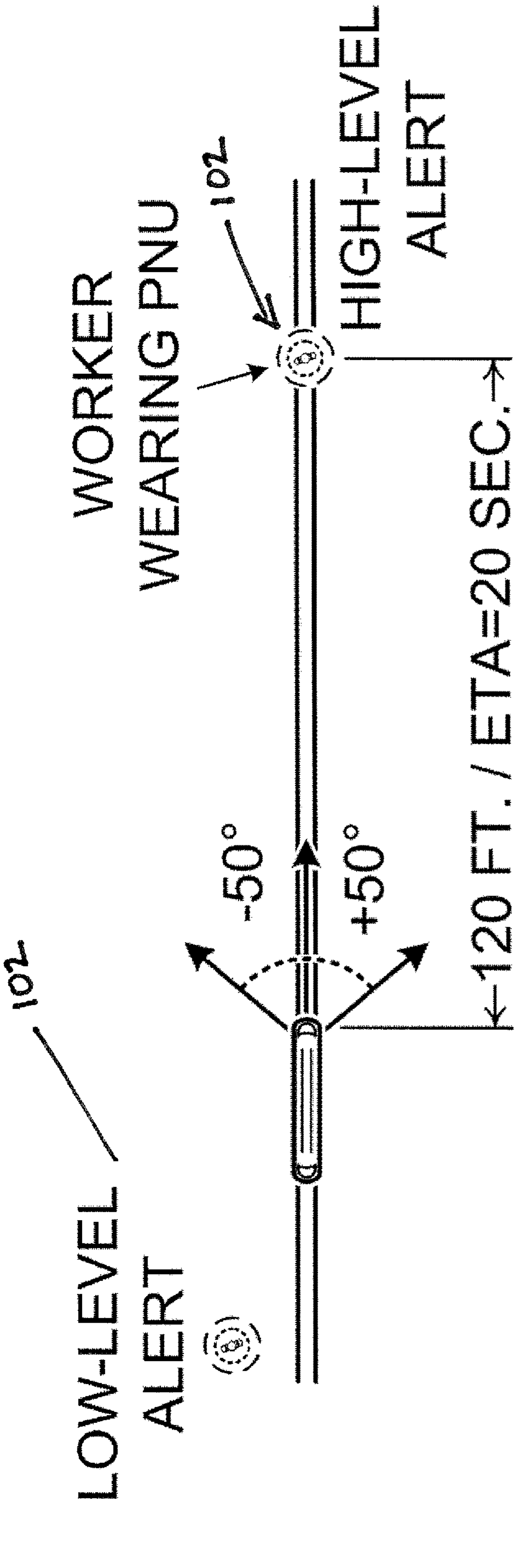
FIG. 4 provides a perspective view of a diagram of the rail-maintenance safety notification system and device (101) in use with a defined route.

FIG. 4 depicts another embodiment of the manner in which a PNU (102) enters an alert mode without use of a warning zone (106). In general, curved sections of a track can compromise the effectiveness of using a vehicle's bearing to determine whether the PNU (102) should trigger an alert mode. As demonstrated in FIG. 4, a PNU (102) on a vehicle's route can be easily outside the vehicle's bearing if the vehicle is approaching from around a curve. To combat this problem, in this embodiment, defined routes are introduced into the system (101). These defined routes (108) are designated points along curved sections of mass transit vehicle's routes in the grid. For example, in one embodiment the defined routes (108) constitute at least 6 GPS points at strung together over the beginning, middle and end of the curve. Thus, in contrast to warning areas (106), a defined route (108) is merely a collection of points strung together alone a mass transit vehicle's route to make a curved line (which corresponds to the curved section of the track). When the VCU (103) travels along these defined routes (108), the PNU (102) incorporates the total length of track between the vehicle and the PNU (102) in order to calculate the actual distance (and therefore the ETA) from the worker. Stated differently, the PNU (102) finds the points it is nearest to on the defined route (108) and this becomes the point of calculation for the vehicle's ETA. Along sections of a track to which defined routes (108) are assigned, the vehicle's bearing is only figured into the calculation to determine whether the vehicle is moving toward or away from the PNU (102). In some embodiments, a warning area (106) will exist around the defined route (108). This warning area (106) will notify the PNU (102) that the ETA must be calculated via a curved route, not a straight line.

In one embodiment of the PNU (102) and the system (101), the PNU (102) will have a fail safe operation. In PNUs (102) with this operation, the PNU (102) will enter fail safe alert mode and send a notification to a worker and the system (101) as a whole as discussed further herein when the PNU (102) losses its ability to determine its location. For example, PNUs (102) with global positioning based location methodologies will enter into fail safe alert mode when the satellite signal is lost (e.g., when a worker enters a tunnel) and the PNU (102) can no longer determine its location in real time. In certain preferred embodiments, it is contemplated that the PNU (102) will emit a lower level alert signal (such as a low beep) when it enters fail safe alert mode. In this fail safe operation, the located-based information alert packet issued by the PNU (102) when the fail safe mode is activated retains the last detected position of the PNU (102). If a PNU receives a AVL packet from a VCU (103) while the fail safe mode is activated (e.g., when a vehicle enters the tunnel) the PNU (102) will automatically emit a high alert signal. The PNU (102) will generally leave the fail safe alert mode when the PNU (102) regains its ability to determine its location. Further, in another contemplated embodiment, fixed special areas will be established around tunnels and other obstructions in a grid that could alter, modify or terminate a PNU's (102) ability to determine its location in real-time. When a PNU enters these fixed special areas, a fail safe mode is activated as discussed above.

In another embodiment of the PNU (102), the PNU (102) will have a panic button. This button functions as a PNU-to-PNU warning signal system. When pressed by a worker, the panic button will send a signal to the other PNUs (102) within a defined area; e.g., all other PNUs within a mile radius. This feature can be used to alert workers of potentially hazardous situations which a single worker encounters, and allow them time to move to safety or if a worker is in need of attention.

In practice, in one embodiment, the disclosed safety notification system and device (101) would work as follows. As depicted in FIG. 1, a given PNU (102) would determine and transmit the location-based coordinates of the worker wearing the unit to at least one VCU (103), a plurality of priority detectors (107), other PNUs (102), and/or the central control center (104). Further, a given VCU (103) would transmit its AVL information to the plurality of PNUs (102) in the grid. Upon the exchange of this information, based upon the location of the worker, the velocity, bearing and location of the train, and the train's scheduled route, whether or not the PNU (102) is in a defined warning zone, the type of warning zone, whether or not the PNU (102) is in a defined route, and other defined variables, the PNU (102) determines whether or not an alert mode needs to be triggered by the PNU (102) and transmitted to the other components of the system. Upon activation of the alert mode, the PNU (102) will trigger an alert signal and notify the worker, via audio, movement, visual or other signals that the worker is in a track area (106). The warning sound made by the PNU can be modified via tone or the spacing and rhythm of the tones to represent the severity of the alert. Upon receiving this signal, the worker will know that he or she must immediately leave the zone and head to a safer location. In the alternative, the VCU (103) can determine when a PNU (102) is within a warning zone and send an alert mode signal to the PNU (102). In addition, any signal sent by either the PNU or the VCU may also be sent to the central control server (104) notifying the central control server (104) of the impending potential safety issue presented by the situation.

In the embodiment of the system (101) in which the VCU (103) controls the mass transit vehicle's speed, the system (101) generally works as follows. First, based upon the exchange of information between a PNU (102) and a plurality of VCUs (103) in the system, the velocity, bearing and location of the train, the train's scheduled route, whether or not the PNU (102) is in a defined warning area (106), the type of warning area (106), whether or not the PNU (102) is in a defined route, and other defined variables, the PNU (102) determines whether or not an alert mode needs to be triggered by the PNU (102) and transmitted to the other components of the system. When an alert mode is triggered and sent to a VCU (103) in the system (101), the VCU (102), upon receiving the alert mode, will slow down to a speed that will allow it to stop, if needed, before encountering the PNU-equipped worker. This embodiment of the system (101) is particularly helpful in curved sections of the track where a train operator cannot see objects on the track beyond the bend.

The benefits of the disclosed safety notification device and system (101) are numerous. First, the disclosed device and system (101) increases the safety of the mass transit system by: 1) increasing the awareness of oncoming vehicles for maintenance workers, even in unfavorable environments and situations; 2) notifying workers and administrators when workers are not located in the correct working zones; and 3) notifying vehicle operators when workers are on or near the route so the speed and direction of the vehicle can be adjusted to ensure safety. Second, the system and device (101) is easily installed and integrated into existing mass transit control and monitoring systems as, in certain embodiments, it is structured to work with the standard equipment in the mass transit system, including the PTC system in applicable embodiments. Third, the system and device (101), through its reporting and log creation function, allows for administrators to evaluate trends and identify reoccurring safety issues and locations in the mass transit system as a whole. Finally, the disclosed system and device (101) is generally low maintenance. For example, the PNU (102), in certain embodiments, will require only occasional battery recharging.

While the invention has been disclosed in conjunction with a description of certain embodiments, including those that are currently believed to be the preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

The invention claimed is:

1. A safety notification system comprising:
- a vehicle equipped with a vehicle equipment unit and having a defined route of travel;
- an individual equipped with a personal notification unit;
- a network which communicatively connects the vehicle equipment unit to the personal notification unit;
- a track area zone along the defined route; and
- a silent area zone;
- wherein when the vehicle is within a predetermined proximity to the track area zone, the vehicle equipment unit transmits automatic vehicle location information to the personal notification unit; and
- wherein the personal notification unit receives the information transmitted from the vehicle equipment unit and makes a decision about transmitting a warning to the individual about the vehicle, the decision comprising:
  - transmitting the warning to the individual only if the individual is in the track area zone and the vehicle's bearing indicates it is on the defined route; and
  - not transmitting the warning to the individual if the individual is in the silent area zone or the vehicle is off the defined route.

2. The safety notification system for a mass transit grid of claim 1, wherein the personal notification unit is a handheld hardware device.

3. The safety notification system for a mass transit grid of claim 1, wherein the personal notification unit is integrated into the one or more individual's safety equipment.

4. A safety notification system comprising:
- a vehicle equipped with a vehicle equipment unit and having a defined route of travel;
- an individual equipped with a personal notification unit;
- a network which communicatively connects the vehicle equipment unit to the personal notification unit;
- a track area zone including a portion of the defined route; and
- a silent area zone;
- wherein when the vehicle is within a predetermined proximity to the track area zone, the vehicle equipment unit transmits automatic vehicle location information to the personal notification unit; and
- wherein the personal notification unit receives the information transmitted from the vehicle equipment unit and makes a decision about transmitting a warning to the individual about the vehicle, the decision comprising:
  - determining an estimated time of arrival of the vehicle at the personal notification unit;
  - transmitting the warning to the individual only if the individual is in the track area zone, the vehicle's bearing indicates it is on the defined route, and the estimated time of arrival is less than a defined amount; and
  - not transmitting the warning to the individual if the individual is in the silent area zone, the vehicle is off the defined route, or the estimated time of arrival is greater than the defined amount.

5. The system of claim 4 wherein determining an estimated time of arrival of the vehicle is based on the vehicle's current velocity and the vehicle's current distance from the personal notification unit.

6. The system of claim 4 wherein determining an estimated time of arrival of the vehicle is based on the vehicle's current velocity and a length of the portion of the defined route within the track area zone.

7. The system of claim 6 wherein the length of the portion of the defined route is based on the portion curving within the track area zone.

* * * * *